US009116035B2

(12) United States Patent
Gouch et al.

(10) Patent No.: US 9,116,035 B2
(45) Date of Patent: Aug. 25, 2015

(54) METHOD AND APPARATUS FOR IMAGE SCANNING (71) Applicant: FFEI Limited, Hemel Hempstead, Hertfordshire (GB)

(72) Inventors: Martin Philip Gouch, Hemel Hempstead (GB); William Roland Hawes, Hemel Hempstead (GB)

(73) Assignee: FFEI Limited, Hertfordshire (GB)

( * ) Notice: Subject to any disclaimer, the term of this patent is extended or adjusted under 35 U.S.C. 154(b) by 203 days.

(21) Appl. No.: 14/020,067

(22) Filed: Sep. 6, 2013

(65) Prior Publication Data

US 2014/0071438 A1  Mar. 13, 2014

(30) Foreign Application Priority Data

Sep. 7, 2012 (GB) .................................. 1216023.0

(51) Int. Cl.
  *G01J 1/02* (2006.01)
  *G01J 1/04* (2006.01)
  *G01J 1/24* (2006.01)
  *G02B 21/00* (2006.01)

(52) U.S. Cl.
  CPC ................. *G01J 1/02* (2013.01); *G01J 1/0407* (2013.01); *G01J 1/24* (2013.01); *G02B 21/006* (2013.01)

(58) Field of Classification Search
  CPC ............... G02B 21/006; G02B 21/241; G02B 21/0016; G02B 21/008
  USPC ......................................................... 356/123
  See application file for complete search history.

(56) References Cited

U.S. PATENT DOCUMENTS

| 5,446,276 | A | * | 8/1995 | Iyoda et al. ................. 250/208.1 |
| 5,475,207 | A | * | 12/1995 | Bobba et al. ................ 235/462.4 |
| 5,763,871 | A | * | 6/1998 | Ortyn et al. ................. 250/201.3 |
| 5,912,699 | A | * | 6/1999 | Hayenga et al. ............... 348/132 |
| 7,015,418 | B2 | * | 3/2006 | Cahill et al. .............. 219/121.69 |
| 7,202,953 | B1 | | 4/2007 | Mueller et al. |
| 7,345,755 | B2 | * | 3/2008 | Ogawa et al. .............. 356/237.5 |
| 7,485,834 | B2 | | 2/2009 | Gouch |
| 2004/0223632 | A1 | * | 11/2004 | Olszak .......................... 382/128 |
| 2005/0286800 | A1 | | 12/2005 | Gouch |

FOREIGN PATENT DOCUMENTS

DE  20 2009 003 288 U1  7/2009

OTHER PUBLICATIONS

British Search Report for GB1216023.0 dated Jan. 5, 2013.

* cited by examiner

*Primary Examiner* — Michael A Lyons
*Assistant Examiner* — Jarreas C Underwood
(74) *Attorney, Agent, or Firm* — Sughrue Mion, PLLC (57) ABSTRACT A method of estimating an in-focus level of a target in an image scanning apparatus, wherein the image scanning apparatus comprises a first line scan detector configured to obtain one or more image scan lines of the target and a second line scan detector configured to obtain one or more focus scan lines of the target, the second line scan detector comprising at least one focus shifting element such that each focus scan line is obtained at respective first and second focus levels, wherein the first focus level is different from the second focus level, the method comprising: obtaining at least one focus scan line of the target using the second line scan detector; obtaining at least one image scan line of the target using the first line scan detector, the image scan line being obtained at a respective third focus level; calculating at least one focus parameter using the at least one focus scan line; and estimating a nominal in-focus level of the target using the at least one focus parameter.

40 Claims, 12 Drawing Sheets

METHOD AND APPARATUS FOR IMAGE SCANNING

This application claims priority based on British Patent Application No. 1216023.0 filed Sep. 7, 2012, the contents of which are incorporated herein by reference in their entirety.

The invention relates to a method and apparatus for image scanning. In particular the invention relates to the use of a virtual microscope.

Virtual microscopes are well known and are commonly used to scan biological samples. Typically, virtual microscopes convert images of glass slides holding the biological samples into digital slides that can be viewed, managed, and analyzed.

One of the main difficulties when using a virtual microscope with slides is to maintain focus over all of the sample as the depth of focus is generally very small, typically 1 μm, whilst the thickness of the sample can vary by many microns. One technique to address this issue involves collecting multiple images at multiple focal planes (often referred to as a focus stack), as described in WO2003073365 and U.S. Pat. No. 6,640,014. This technique, however, requires many more times the data than that required for a single focus level image and can lead to significantly longer times to scan an image.

Figure 1:
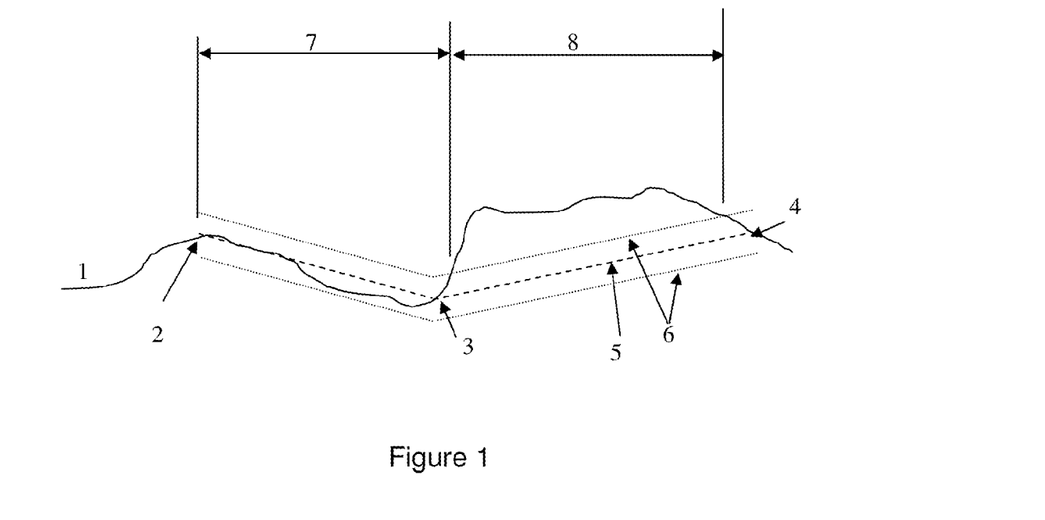
FIG. 1 is a schematic representation of a prior art technique for imaging a sample surface which is irregular in focal shape.

Another technique to achieve focus in a single image is to measure the focus of the sample at a number of points and generate a function which estimates the focus over the whole sample, as described in US20090195688 and WO04095360. Although this focusing technique produces a single image that is in focus in much of the sample, if the sample is not linear in the focal plane between those points, the sample will become out of focus. For example, FIG. 1 shows that if a sample surface 1 is irregular in focal shape and is measured at points 2, 3 and 4, then the linear interpolation between the points will give a trajectory 5 of the scanning system's focus. This scanning trajectory 5 produces an in focus region 6. As may be seen in FIG. 1, in a region 7 the sample is in focus, however in another region 8 the sample is out of focus.

Figure 2:
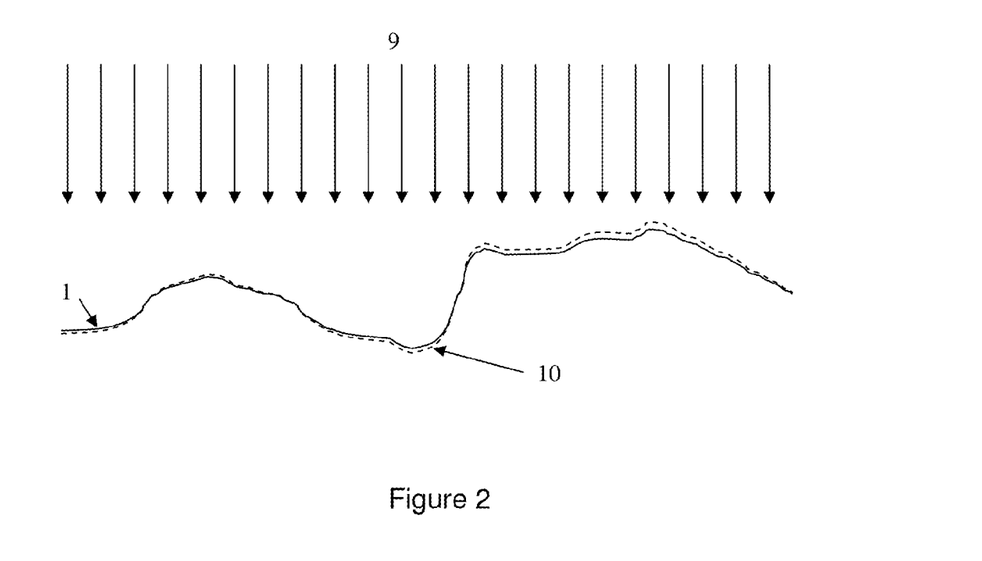
FIG. 2 is a schematic representation of another prior art technique for imaging a sample surface which is irregular in focal shape.

A preferred technique to achieve focus is to measure the focus while scanning an image, and to adjust the focus of the scanning device to maintain focus. One such technique is described in U.S. Pat. No. 7,485,834. As shown in FIG. 2, the focus may be continuously monitored 9 during the scanning and adjusted to give a focus track 10 which is very close to the focus of the sample 1.

A difficulty with the technique described in U.S. Pat. No. 7,485,834, is that it requires a rapid movement of the focus during the scanning process. This issue is addressed in GB1113071.3 where a separate line sensor is used in conjunction with the imaging sensor to continuously monitor and maintain the focus of the scanner without the need to rapidly change the focus of the scanner.

A disadvantage of using a single focus detector with an imaging detector is an uncertainty that the imaging detector is at the optimum focus. Although it is possible to maintain focus with a single focus detector and imaging detector, this uncertainty on where the optimum focus is means that any corrections to the focus level in order to keep the focus tracking the sample are less certain and generally damped or of small magnitude, and therefore the rate of tracking is slow.

Accordingly, there is a need for a technique which addresses the above issues.

In accordance with a first aspect of the present invention there is provided a method of estimating an in-focus level of a target in an image scanning apparatus, wherein the image scanning apparatus comprises a first line scan detector configured to obtain one or more image scan lines of the target and a second line scan detector configured to obtain one or more focus scan lines of the target, the second line scan detector comprising at least one focus shifting element such that each focus scan line is simultaneously obtained at respective first and second focus levels along the focus scan line, wherein the first focus level is different from the second focus level, the method comprising:

obtaining at least one focus scan line of the target using the second line scan detector;

obtaining at least one image scan line of the target using the first line scan detector, the image scan line being obtained at a respective third focus level;

calculating at least one focus parameter using the at least one focus scan line; and estimating a nominal in-focus level of the target using the at least one focus parameter.

Here, the term "level" can be seen to be analogous to "position", such that the nominal in-focus level is the position of the focal plane of the image scanning apparatus when imaging the target. Preferably, the first line scan detector is operable to obtain an output image of the target which is desired to be in focus, and therefore the method preferably further comprises adjusting the focus level of the first line scan detector to the nominal in-focus level of the target. In other words, the position of the first line scan detector is adjusted such that the first line scan detector is in the focal plane of the image scanning apparatus and the target is thus in focus.

It is important that the first and second focus levels of the at least one focus scan line are different so that the at least one focus parameter can be more accurately obtained using two different focus levels. Advantageously, this provides an increased number of data points obtained simultaneously, thereby enabling a quicker, more accurate estimation of the in-focus level.

Furthermore, where a third focus level of the image scan line is different from the first and second focus levels, three level focus data may be obtained from only two sensors: first and second focus levels from the second line scan detector, i.e. the focus sensor, and a third focus level from the first line scan detector, i.e. the imaging sensor. Three level focus data is advantageous as the optimum focus may be determined with more certainty so that more rapid corrections (up to 20 times faster) can be produced, whilst avoiding the use of more complex systems, such as a system with two focus detectors and one imaging detector for example.

The at least one focus parameter is a means of relating a focus level of a line scan detector to a measure of how "in focus" an image scan line is at that particular focus level. The focus parameter may take a number of forms, although preferably the focus parameter is a "focus merit" value having a maximum value representing an in-focus level. The focus merit value maps how "in focus" the image scan lines are on to a numerical scale.

In order to obtain two different focus levels (the first and second focus levels) with a single line scan detector, the second line scan detector i.e. the focus sensor, is provided with at least one focus shifting element. Here the at least one "focus shifting element" can be seen to be an optical element which changes the focus level of the focus sensor within at least one section or patch on the sensor. The change in focus level may occur due to a change in optical thickness of a section of the sensor, which is dependent on the refractive index as well as the thickness of the section. Hence, one or each of the refractive index or thickness may be modulated to achieve a desired optical thickness.

Preferably, the at least one focus shifting element comprises a first plurality of transparent regions having a first refractive index and a second plurality of transparent regions having a second refractive index which is higher than the first refractive index, thus providing two focus shifting elements. This may be achieved for example by a number of transparent glass windows mounted in front of the focus sensor which act as focus shifting elements. In other words the focus is "shifted" by varying the refractive index of the optical elements.

In further preferred embodiments, the at least two focus shifting elements comprise a plurality of transparent regions having a first thickness, and a plurality of transparent regions having a second thickness which is greater than the first thickness. This may be achieved, for example, by alternating "thick" and "thin" sections. In other words, in addition or alternatively to varying the refractive index, the focus may be shifted by varying the thickness of the optical elements.

Using the focus shifting elements may therefore provide at least two focus planes of the second line scan detector. Preferably, two focus planes are arranged on either side of the focal plane of the first line scan detector, for example to avoid difficulties in curve fitting, when estimating a nominal in-focus level.

The method of the present invention comprises calculating at least one focus parameter using the at least one focus scan line. It is important that at least one focus parameter is obtained from the at least one focus scan line in order to estimate the in-focus level. In some embodiments the in-focus level may be estimated using only focus parameters obtained from the focus scan line(s) without using the image scan lines. This works best when the target is substantially homogenous across its area imaged by the line scan detector. However, the in-focus level may also be estimated by comparison of a focus parameter calculated from the at least one focus scan line with a focus parameter calculated from the at least one image scan line.

The method may further comprise the step of calculating at least one further focus parameter using either said at least one image scan line or a further said focus scan line. For example, a further focus parameter may be obtained from an image scan line. By ensuring that the first and second focus levels of the at least one focus scan line are different to the third focus level of the at least one image scan line, this third focus parameter can be compared with the focus parameters calculated using a focus scan line in order to estimate the in-focus level. Preferably the focus parameters are normalised (typically to the focus parameter calculated from the image scan line). This simultaneous calculation of two focus parameters at differing focus levels allows for a particularly fast and accurate in-focus level estimation. Alternatively, a further focus parameter may be obtained from a further focus scan line at a different focus level to that of the first focus scan line. The two focus parameters from the focus scan lines can then be used to estimate the in-focus level.

A plurality of focus parameters are typically calculated—one for each focus level of the second line scan detector. These plurality of focus parameters are preferably normalised to a focus parameter obtained from an image scan line and used to generate a "focus merit curve", which plots the focus merit obtained at each focus level against the focus levels. The maximum of this curve can then be used to estimate the in-focus level of the target and the first line scan detector is moved towards this maximum. Modulating the focus level of the second line scan detector advantageously removes the requirement for several line scan detectors at different focus levels, which would decrease the amount of light impinging on the first line scan detector, thereby decreasing image quality.

There are a number of ways of modulating the focus level of the second line scan detector, which shall be discussed in more detail below.

The image and focus scan lines may be obtained from a common position within a plane passing through the target and having a plane normal defining an optic axis along which each of the first and second line scan detectors receive image information so as to produce the said respective image and focus scan lines. Image information may be reflected to one of the said line scan detectors using a beam splitter. This ensures that each of the first and second line scan detectors simultaneously images the same spatial location on the target as the beam splitter produces two images of the same spatial location on the target. A beam splitter may also be used to direct image information to a third line scan detector at a further focus level different from those of the first and second line scan detectors, such that a further focus parameter can be calculated. Using as beam splitter advantageously means that the calculated focus parameters are not affected by spatial variations in the target, thereby simplifying the in-focus level estimation and improving its accuracy. Other means of reflecting the image information are envisaged, however.

Alternatively, the image and focus scan lines may be obtained from different positions in the target and wherein image information is obtained by the said first and second line scan detectors along different optic axes from the target. Although this means that the first and second line scan detectors simultaneously image different spatial regions of the target, this does ensure that each detector is fully illuminated (unlike with the use of a beam splitter), thereby improving image quality. This is particularly important for the output image from the first line scan detector.

The first and second line scan detectors may be located adjacent each other, or alternatively image information may be reflected to one of the said line scan detectors using a mirror, such as a turning mirror. As the first and second line scan detectors receive image information along different optic axes from the target, use of the mirror to reflect light to one of the line scan detectors advantageously does not reduce the illumination of the other line scan detector.

The method may further comprise rotating the mirror about a point centred upon the optic axis of the line scan detector to which it is reflecting image information (preferably the second line scan detector), so as to provide focus scan lines of the target at different focus levels. In a similar manner as described above, here the focus parameters may be used to generate a focus merit curve plotting the focus merit values of the focus scan lines at each focus level. The peak of the focus merit curve then provides the nominal in-focus level of the target and the first line scan detector is moved towards that maximum.

Alternatively, the mirror may be rotated about a point displaced from the optic axis of the line scan detector to which it is reflecting image information. Advantageously, this provides a greater change in focus level with the same turning angle of the mirror.

If the target is moved relative to the image scanning apparatus (i.e. during a scan), the target is preferably moved in accordance with the rotation of the mirror such that the focus line scans are obtained from a common location upon the target. This ensures that the focus parameters, such as focus merit values, are not affected by spatial variations in the target. This allows for a more accurate estimate of the in-focus level.

As an alternative to rotating the mirror, the method may comprise moving the second line scan detector with respect to the target so as to obtain a plurality of focus line scans at different focus levels. The movement of the second line scan detector is preferably to and fro along its optic axis. In a similar manner as described above, here the focus parameters may be used to create a focus merit curve by plotting the focus merit values of the focus scan lines at each focus level. The peak of the focus merit curve then provides the estimated nominal in-focus level of the target.

As a further alternative, the method may comprise the step of modulating the focus level as a function of position across the scan line of the second line scan detector. For example, the second line scan detector may be rotated about an axis perpendicular to its optic axis. This provides a differential focus along the scan line of the detector, which can be used to calculate the focus parameter(s) for the second line scan detector. As an alternative, the second line scan detector may be positioned at an angle to the optic axis such that each position on the second line scan detector is at a different focus level. A focus parameter may then be calculated at each focus level.

The line scan detectors may be multi-channel detectors, with the method further comprising calculating an in-focus level for different channels of the detector. Typically the multi-channel detector will be an RGB detector. Due to the different frequencies of coloured light, each of the RGB channels has a different focus level. This feature can be used to evaluate a focus parameter for each channel and using one or more of the focus parameters for the channels in estimating the nominal in-focus level of the target. Evaluating a focus parameter for each channel provides an increased number of data points, thereby improving the accuracy of the estimated in-focus level.

If the target is moved relative to the image scanning apparatus, a temporal shift may be applied between the data from the scan lines of the first and second line scan detectors, wherein the temporal shift is a function of the relative movement between the target and the image scanning apparatus. This advantageously ensures that the data from the scan lines of the first and second line scan detectors is from the same spatial location on the target. This improves the accuracy of the in-focus level estimation as the focus parameters (for example focus merit values) are not affected by spatial variation on the target.

The image scan lines may be obtained from a number of locations upon the target so as to form a swathe. This is preferably performed by moving the target relative to the first and second line scan detectors such that the detectors image the target one line at a time. The line scan detectors preferably each comprise a linear array of sensors in order to scan one line of the target at a time. The target is typically moved in a plane perpendicular to the optic axis of at least one of the line scan detectors. Preferably, the focus level of the first line scan detector is adjusted to the nominal in-focus level in real time during the formation of a swathe such that the image scan lines within the swathe are obtained at different focus levels. This advantageously allows fast, in-focus scanning of a target. The scanning speed may be temporarily slowed if necessary in order to allow time for the first line scan detector to adjust to the in-focus position. However, it is generally assumed that the in-focus level will not substantially change over a small number of image lines, so this is not always necessary.

In accordance with a second aspect of the present invention, there is provided an image scanning apparatus comprising:

a first line scan detector configured to obtain one or more image scan lines of a target;

a second line scan detector configured to obtain one or more focus scan lines of the target, the second line scan detector comprising at least one focus shifting element such that each focus scan line is simultaneously obtained at respective first and second focus levels along the focus scan line; and a processor configured to:

obtain at least one focus scan line of the target;

obtain at least one image scan line of the target at a respective third focus level;

calculate at least one focus parameter using the at least one focus scan line; and estimate a nominal in-focus level using the at least one focus parameter.

Preferably, the image scanning apparatus further comprises a first focussing device configured to modify the focus level between the target and the first line scan detector, and wherein the processor is further configured to operate the first focussing device to move the focus level of the first line scan detector to the estimated nominal in-focus level. This ensures that once the in-focus level has been estimated, the first line scan detector can be moved to said level in order that images of the target are in focus.

Preferably the image scanning apparatus further comprises a target stage for retaining the target, imaging optics for causing an image of the target to be provided to the first and second line scan detectors, and a drive system for causing the first line scan detector to obtain image information from different locations on the target. The imaging optics may for example comprise a lens for converging light rays originating from the target on to the first and second line scan detectors. In a case where each of the first and second line scan detectors is arranged to image a common location upon the target, the imaging optics may include a beam splitter to direct part of the image information from the target to the first line scan detector and part to the second line scan detector. In a case where the first and second line scan detectors lie upon different respective optic axes of the imaging optics, the imaging optics preferably includes a mirror arranged to direct part of the image information from the target to one of the first or second line scan detectors.

The drive system is preferably operable to move the target with respect to the first and second line scan detectors such that the first and second line scan detectors receive image information from the whole target. For example, the drive system may be operable to move the target stage, with the first and second line scan detectors and imaging optics held stationary; or may be operable to move the first and second line scan detectors and imaging optics, with the target held stationary.

Where the imaging optics comprises a mirror, the image scanning apparatus may further comprise a mirror drive adapted to rotate the mirror so as to direct different image information to the said line scan detector. The rotation of the mirror means that focus scan lines at different focus levels are obtained, and these are used in the generation of the focus parameter(s) of the respective line scan detector. Preferably, the mirror drive is operated in accordance with the drive system such that the focus line scans are obtained from a common location upon the target.

The image scanning apparatus may further comprise a detector drive adapted to move the second line scan detector to and fro along its respective optic axis. In a similar manner to the mirror drive, this means that focus scan lines at different focus levels are generated, which are used in the generation of the focus parameters.

Alternatively, the image scanning apparatus may further comprise a detector drive adapted to rotate the second line scan detector so as to modulate the focus level as a function of position across the scan line of the second line scan detector. Again, this generates a plurality of focus scan lines at different focus levels.

One or each of the first and second line scan detectors may be a multi-channel detector. Preferably the multi-channel detectors are RGB detectors operable to detect red, green and blue light.

Typically the focus levels of the first and second line scan detectors are independently controllable. The first and second scan line detectors are also preferably identical such that the focus parameters are not affected by differences in the detectors. Preferably the apparatus is a virtual microscope.

Typically the apparatus in accordance with the second aspect of the invention is adapted to perform the invention in accordance with the first aspect. The skilled person will appreciate that the line scan detectors described in the first and second aspects may be replaced with any suitable imaging detector.

According to a third aspect of the present invention there is provided a computer program product comprising program code means adapted to perform the method according to the first aspect.

Examples of devices and methods in accordance with the invention will now be described with reference to the following Figures.

Figure 3:
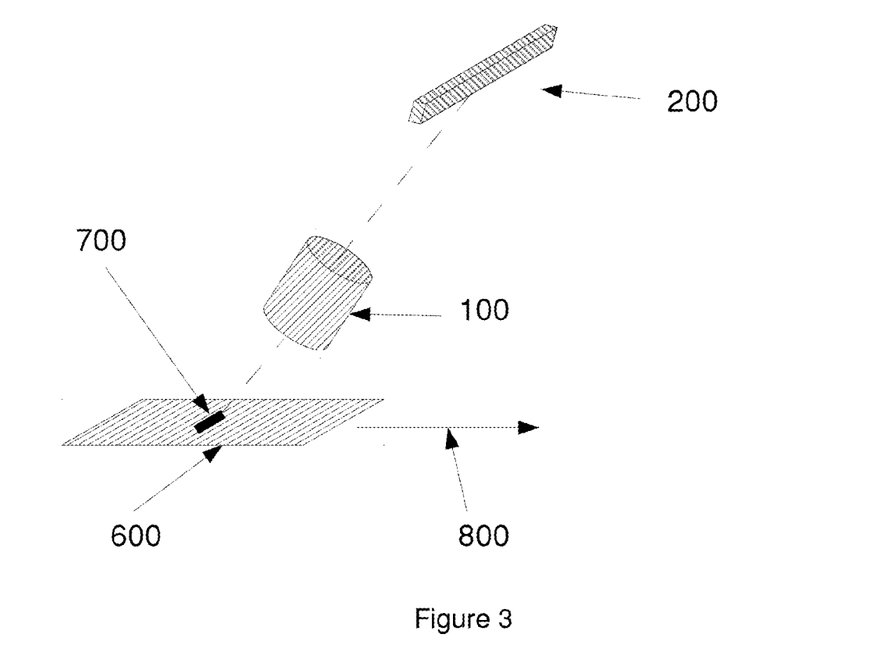
FIG. 3 is a schematic representation of a typical arrangement for a virtual microscope.

A typical arrangement of an imaging system for a virtual microscope may be seen in FIG. 3. The imaging system has a line scan detector 200 imaging via an imaging lens 100 onto a sample on a slide 600. The imaged area 700 produced by the scan detector 200 is a linear (i.e. a "line"), as it follows the shape of the line scan detector. To produce an extended image, the slide 600 may be moved in a direction 800 perpendicular to the line scan detector 200.

Alternatively, the line scan detector 200 and the imaging lens 100 may both be moved to produce a relative movement along the same direction 800.

Figure 4:
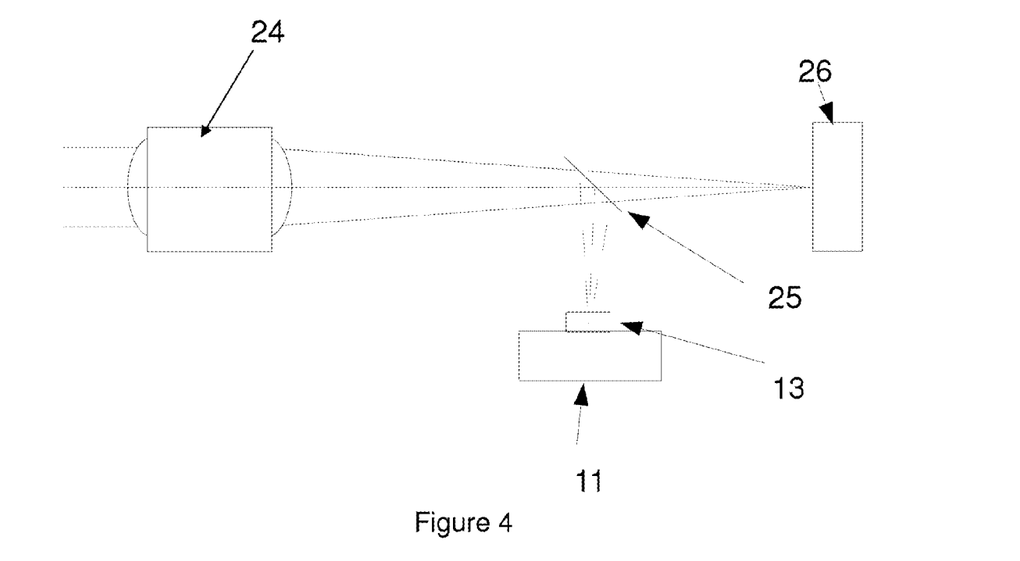
FIG. 4 is a schematic representation of a first embodiment of the invention.

FIG. 4 shows an embodiment of the invention. A sample (not shown) is imaged through an imaging lens 24 onto an imaging sensor 26. The imaging lens 24 may be a normal imaging lens such as a rotationally symmetric lens. For example, the imaging lens 24 may be a tube lens or an objective for a non-infinity corrected system. The imaging sensor 26 is a line scan detector. A beam splitter 25 may divide the imaging beam into two and produce a second image of the sample at a co-conjugate plane. A focus sensor 11 may be placed at a focal plane which is different from the co-conjugate plane.

In a preferred embodiment of the invention the focus sensor 11 is arranged to have two focal planes located on either side of the focal plane of the imaging sensor 26. This may be achieved by having sections of the sensor 11 at one focus level and sections of the sensor 11 at a second focus level. This can be produced for example with a number of transparent glass windows 13 mounted in front of the focus sensor 11, which act as focus shifting elements.

Figure 5:
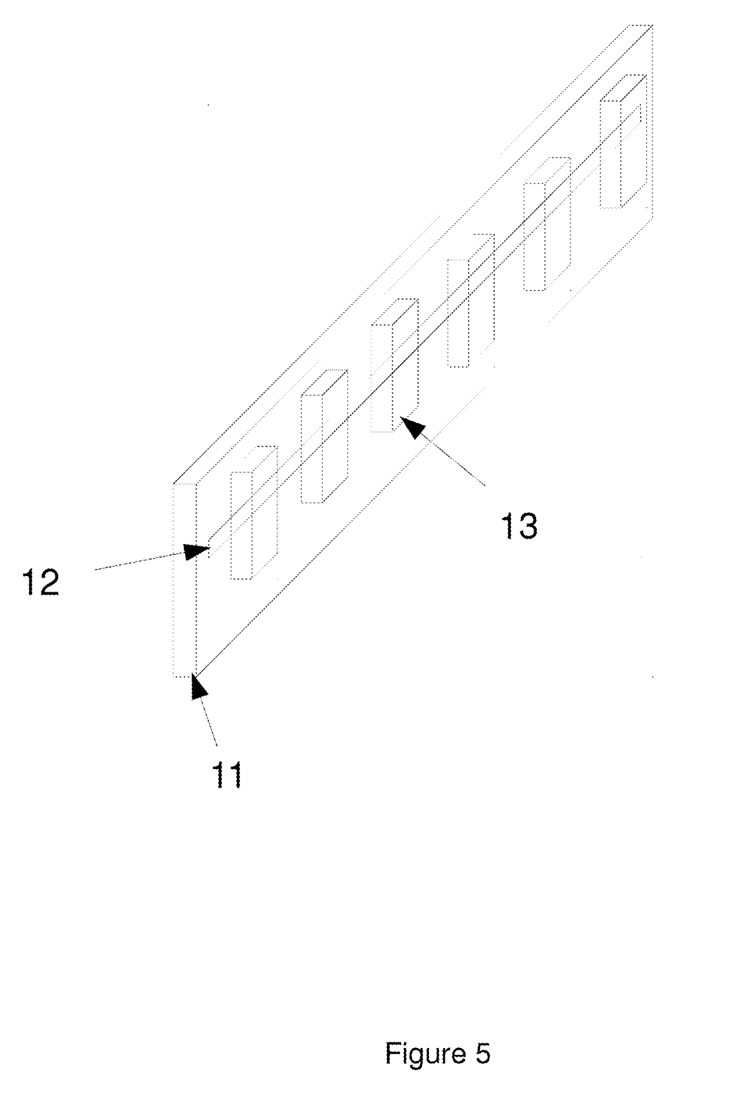
FIG. 5 is a perspective view of a first exemplary focus sensor used in accordance with the invention.

FIG. 5 shows an exemplary focus sensor 11 which may be used in accordance with the invention. The focus sensor 11 has a region which contains photosensitive sites 12. An array of transparent windows 13 is placed in front of the photosensitive sites 12 such that some sites are covered by the glass windows and other sites, spaced between the windows, are not covered.

The refractive index of the transparent windows 13 is different from the refractive index of the air between the windows 13, having the focal plane seen by the photosensitive sites 12 between the windows 13 to be displaced from the focal plane seen by the photosensitive sites 12 under the windows 13. This is analogous to a "swimming pool effect", whereby a swimming pool filled with water (which has a higher refractive index than air) looks shallower to an observer than an empty swimming pool.

Typically the refractive index of air is 1.0 and the refractive index of glass, which is transparent, is 1.5. For example a glass window of thickness of 5 mm can result in a focal shift of 1.6 mm. If the optical magnification of the instrument is 40 times, then this 1.6 mm focal shift at the sensor is $40^2$ times reduced and the focal shift at the sample is 1 µm.

Figure 6:
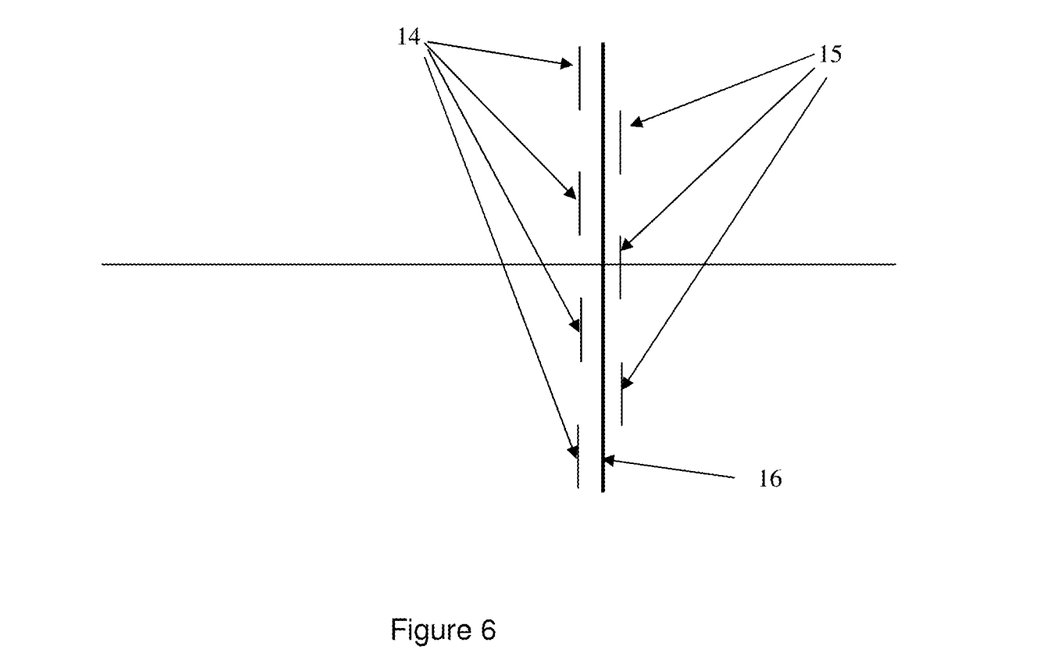
FIG. 6 schematically represents an exemplary arrangement of two focal planes of a focus sensor with respect to the focal plane of an imaging sensor in accordance with the invention.

As shown in FIG. 6, the two focal planes 14, 15 of the focus sensor include regions or patches arranged either side of an imaging sensor focus plane 16. For example, there may be focus detector regions 14 placed 0.5 µm in front of the focus of the imaging detector 16 and focus detector regions 15 placed 0.5 µm behind the focus of the imaging detector 16.

It will be appreciated that the distances at which the two focal planes 14, 15 of the focus sensor 11 are spaced from the focal plane 16 of the imaging sensor 26 may vary and do not have to be equal to each other. Furthermore, the two focal planes 14, 15 of the focus sensor may be arranged on the same side of the focal plane 16 of the imaging sensor 26, although this may result in a less precise measurement of the focus, due to difficulties in curve fitting. It will also be appreciated that the focus sensor 11 may be arranged to have more than two focal planes on either side of the focal plane of the imaging sensor 26. For example, a third focus level may be included on one side of the focal plane 26 of the imaging sensor 26.

Figure 7:
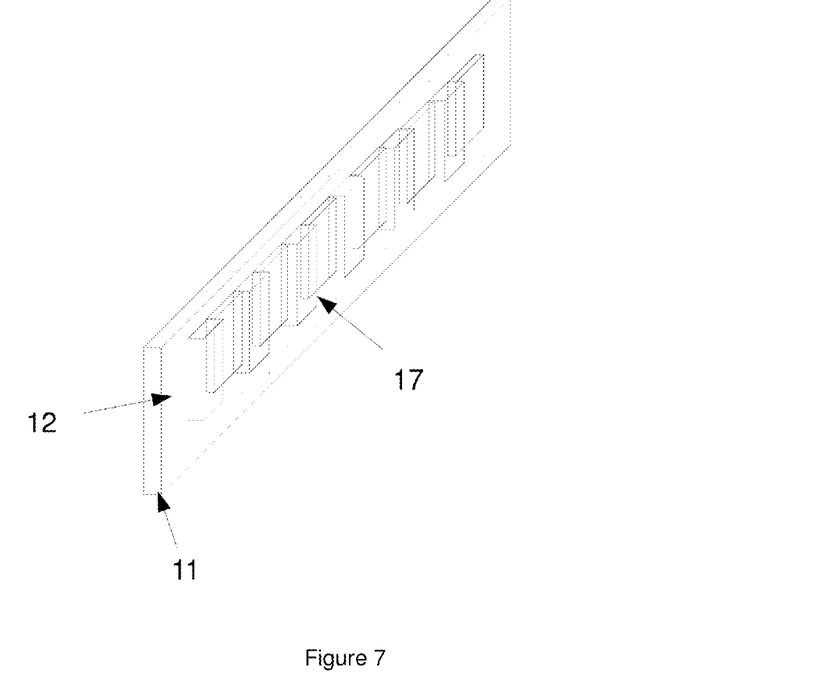
FIG. 7 is a perspective view of a second exemplary focus sensor used in accordance with the invention.
Figure 8:
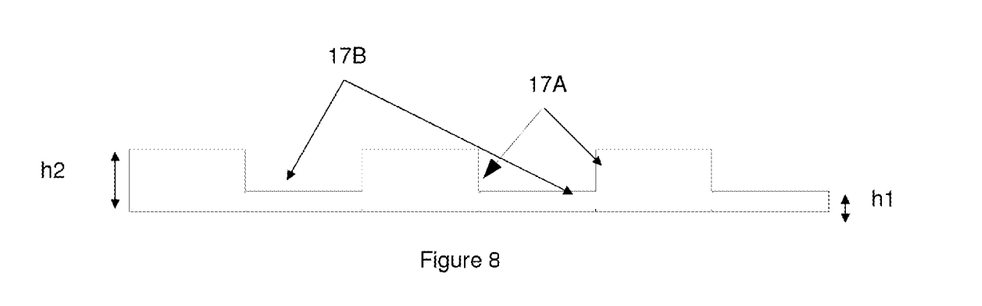
FIG. 8 is a frontal view of the second exemplary focus sensor shown in FIG. 7.

The windows 13 could be replaced, for example, with a window having alternating "thick" and "thin" sections 17A, 17B or "castellations" which form a "castellated structure" 17, as shown in FIGS. 7 and 8. The "thin" sections 17B have a smaller height h1 than the height h2 of the "thick" sections 17A. Typically all of the "thick" sections 17A have the same height h2 and width, and all of the "thin" sections 17B have the same height h1 (smaller than the height h2 of the "thick" sections 17A) and the same width (which is usually equal to the width of the "thick" sections 17A).

The number of "thick" sections 17A and "thin" sections 17B (corresponding to the two focal planes levels of the focus sensor) may vary. Typically, the number of "thick" sections 17A of a focus sensor is equal to the number of "thin" sections 17B of the same focus sensor.

Figure 9:
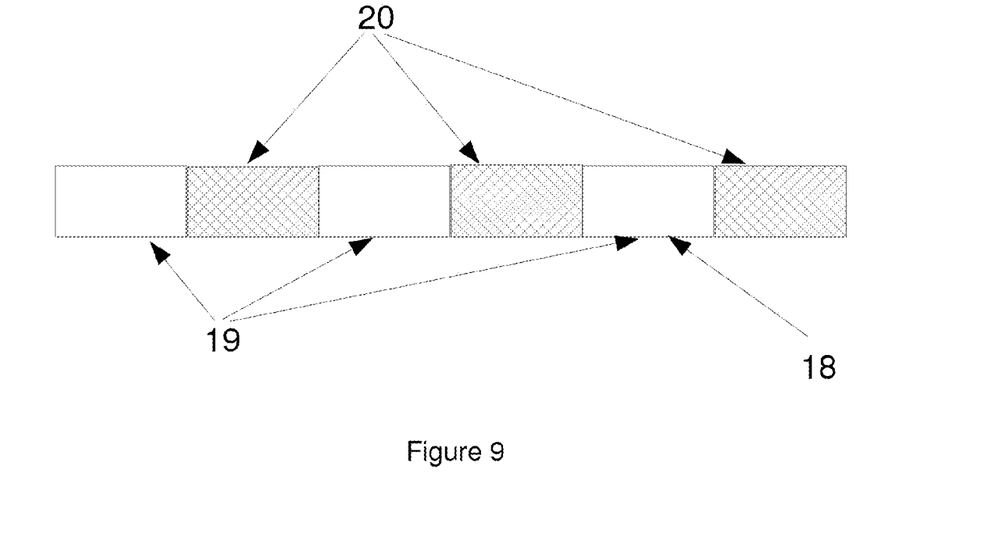
FIG. 9 is a frontal view of a third exemplary focus sensor in accordance with the invention.
Figure 10:
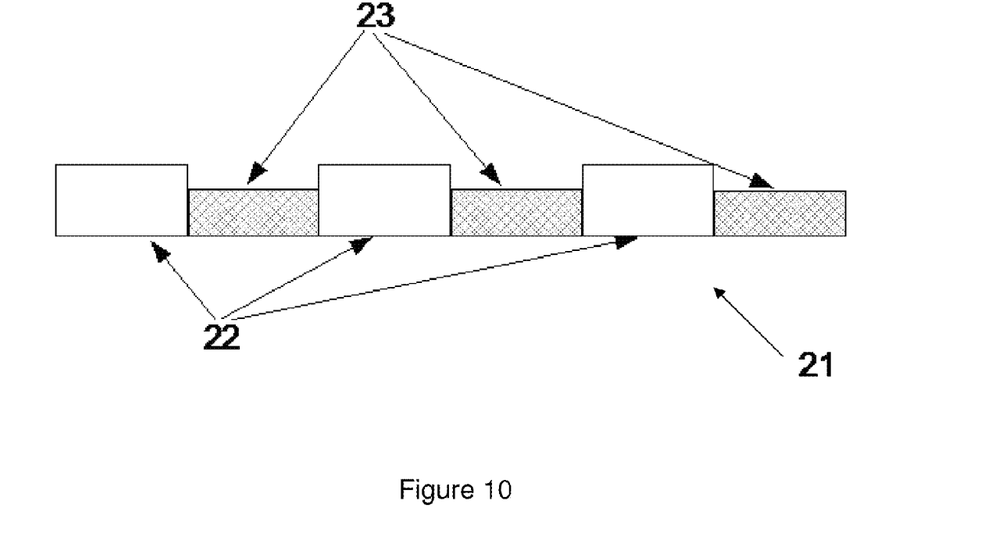
FIG. 10 is a frontal view of a fourth exemplary focus sensor in accordance with the invention.

The same "swimming pool effect" (i.e. obtaining two focus levels of a focus sensor) can be produced by a window 18 of constant thickness with an alternating sequence of high 19 and low 20 refractive index material, as shown in FIG. 9. Alternatively, one may use a hybrid system 21 having high refractive index sections 22 with greater thickness than the thickness of low refractive index sections 23, as shown in FIG. 10.

The imaging sensor 26 and the focus sensor 11 may be substantially identical line scanners, with the exception that the focus sensor 11 is provided with an array of focus shifting elements 18, 17A and 17B, 21 described above with reference to FIGS. 5 to 8. The array of focus shifting elements may be provided in front of the focus sensor in order to provide two focus levels for the focus sensor 11 imaging a target.

Figure 11:
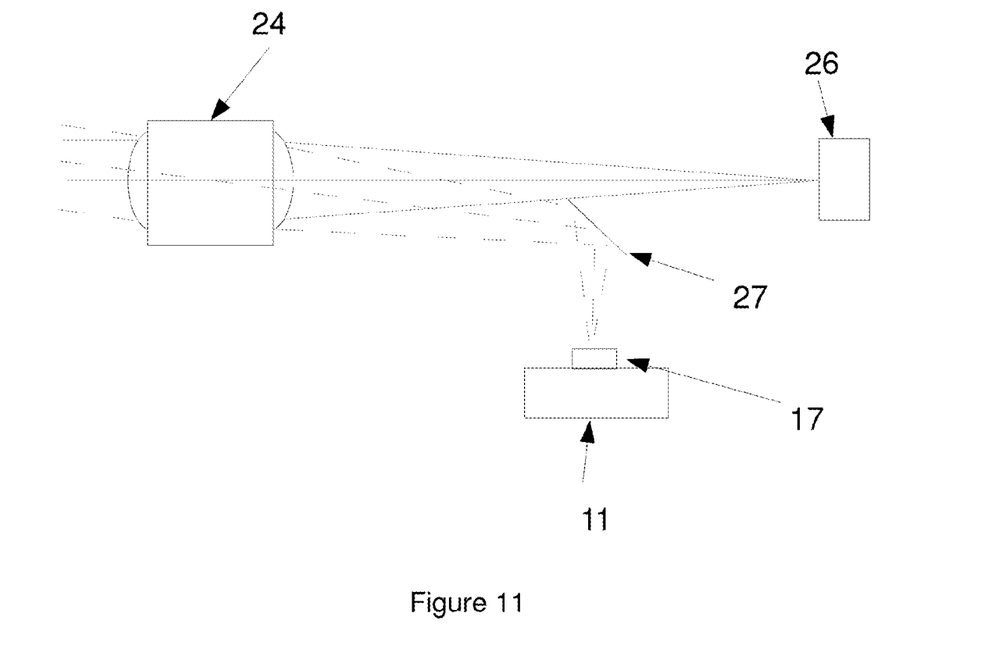
FIG. 11 is a schematic representation of a second embodiment of the invention.

In some cases, the use of a beam splitter 25 can be undesirable as it reduces the light available to the imaging sensor 26. Accordingly, in another embodiment as shown in FIG. 11, the beam splitter 25 may be replaced with a refractive element or mirror 27 which is displaced from the optical axis. The mirror 27 may be displaceable, being referred to as an "off axis turning mirror" 27. As the sensors 11, 26 are line sensors, it is possible to place the focus sensor 11 adjacent to the imaging sensor 26 and to time delay or advance the data from the focus sensor 11 to map onto the same spatial location of the sample as the imaging sensor 26.

Figure 12:
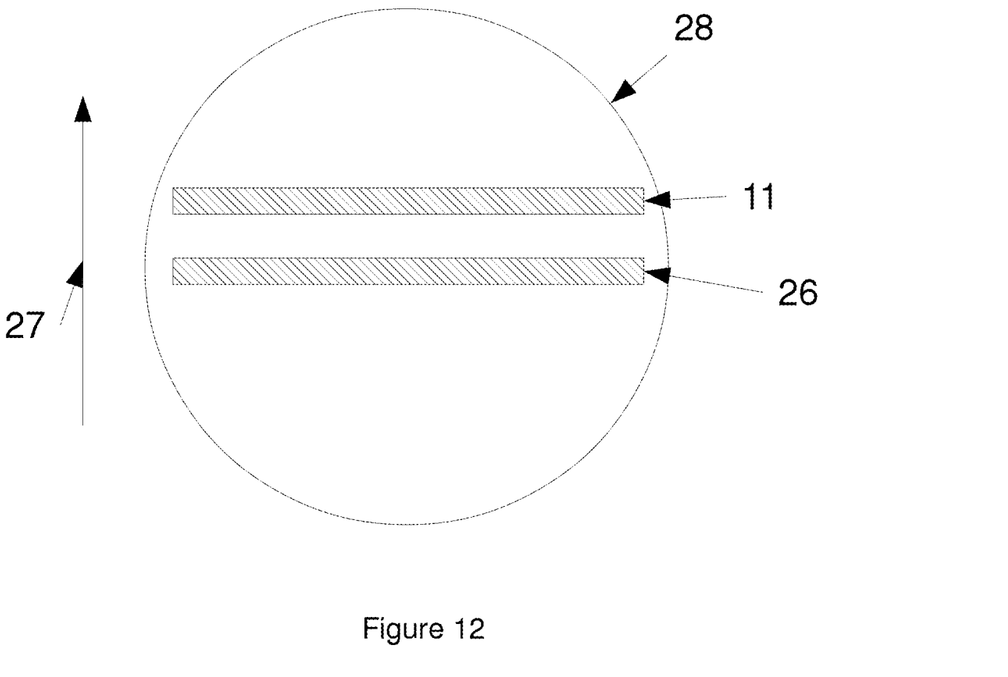
FIG. 12 is a schematic representation of a circular image plane imaged in accordance with the invention.

If the imaging lens 24 is a rotationally symmetric lens, it may produce a circular image plane 28, as shown in FIG. 12. As the line imaging sensor 26 is placed on the optical axis in the centre of the circular imaging plane 28, there is space available to place the focus sensor 11 adjacent to the imaging sensor 26.

In most cases, however, there is not sufficient room to place the sensors 26 and 11 physically adjacent as the size of the packaging of the detectors prevents this. With high magnification imaging systems, although the field numerical aperture may be high, the image numerical aperture is low and the conjugate length is long. This enables an off axis turning mirror 27 to be placed in the beam path which directs the beam to the off axis focus sensor 11 and permits all the light to reach the imaging detector 26. Such an arrangement is shown in FIG. 11 and has also been demonstrated in U.S. Pat. No. 7,645,971. Since the spatial region of the sample seen by each sensor 11, 26 is different, the data from each sensor 11, 26 collected simultaneously will have the focus merit value affected not only by the focus but also by the spatial content for each of the regions imaged. This can be overcome by temporally shifting data collected from each of the sensors 11, 26.

As can be seen in FIG. 12, the scanning motion 27 of the scanning mechanism as indicated by the vertical arrow causes the same spatial region to be sampled firstly by the focus sensor 11 and secondly by the imaging sensor 26. With this time delaying process, the same spatial region can be seen at the different focus levels.

To calculate the focus of the sample, firstly a focus merit value is calculated for the regions 14 of the focus sensor 11 with focus in front of the imaging sensor focus level. Then a focus merit value is calculated for the positions along the imaging sensor 26 which are imaging the same position on the sample as the focus sensor 11 with focus regions 14 in front of the imaging sensor 26 focus level. The focus merit value from the focus sensor 11 with focus in front of the imaging sensor 14 is then normalised with the corresponding imaging sensor 26 focus merit value.

Secondly a focus merit value is calculated for the regions 15 of the focus sensor 11 with focus behind the imaging sensor focus level. Then a focus merit value is calculated for the positions along the imaging sensor 26 which are imaging the same position on the sample as the focus sensor 11 with focus regions 15 behind the imaging sensor 26 focus level. The focus merit value from the focus sensor 11 with focus behind the imaging sensor 15 is then normalised with the corresponding imaging sensor 26 focus merit value.

This produces two focus merit values for the two focus sensor 11 focal planes 14 and 15. A third focus merit value from the imaging sensor 26 can be defined with the normalised value of 1 which is located at the imaging sensor's 26 focal plane 16. A further two focus merit values can be generated as outliers with focus merit value of zero as it can be assumed that planes which are significantly out of focus have a focus merit value of zero.

Figure 13:
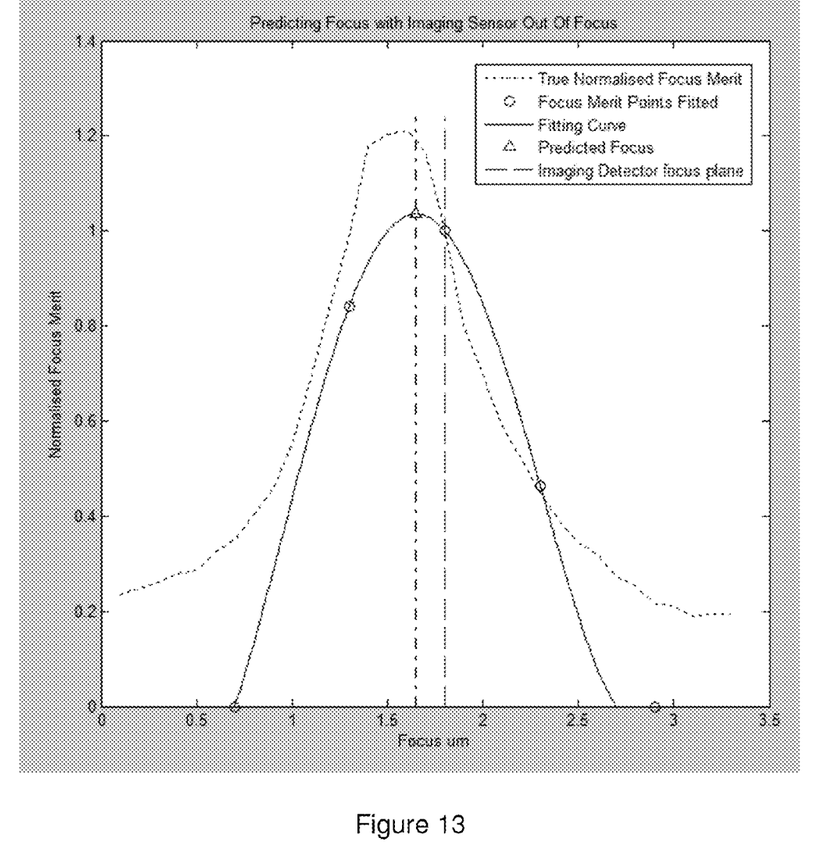
FIGS. 13 and 14 show an exemplary five point curve fit for predicting a focal plane in accordance with the invention.
Figure 14:
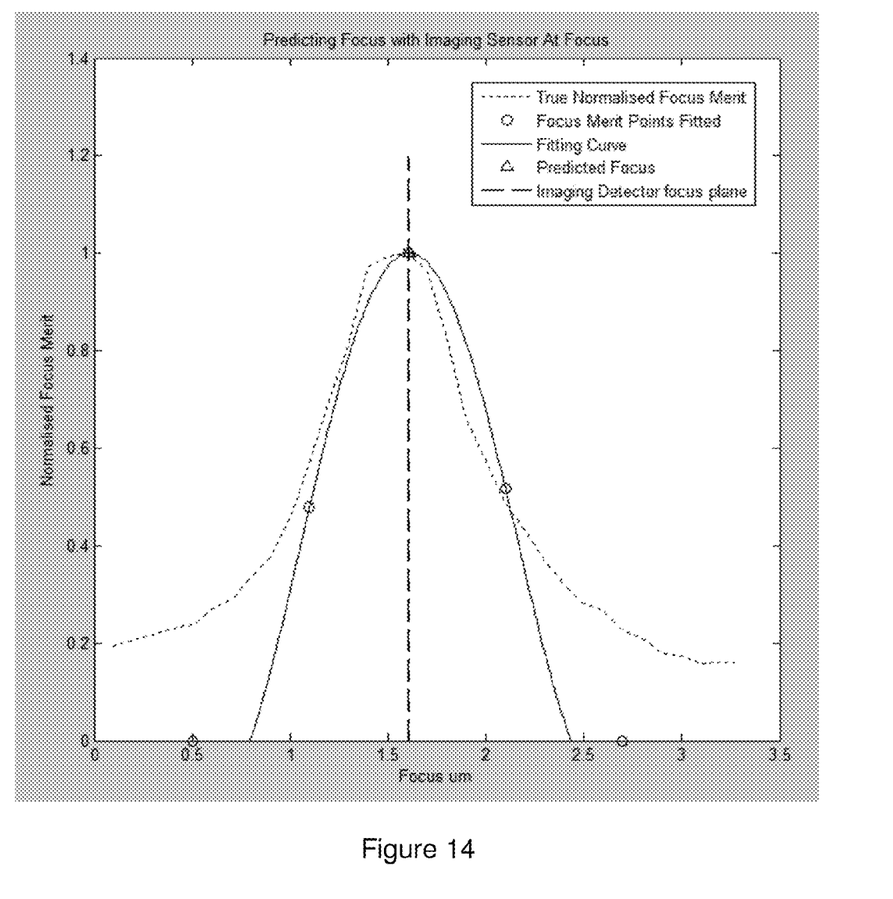

These five focus merit values can then be fitted with a polynomial curve to produce a through focus curve where the peak predicts the focal plane of the sample. FIGS. 13 and 14 show examples of such five point curves being used to predict the location of the focal plane. As an optional additional step, the predicted focus point can be limited to within planes 14 and 15 of the focus sensor 11.

In FIG. 13, the imaging detector focus plane is positioned at approximately 1.7 µm along the focussing line scan detector. Five focus merit points, represented by circles, have been fitted with a polynomial curve, represented in solid line. As an example a 'true' focus merit curve, represented in dotted line, has been determined by collecting data with the imaging sensors at a number of focus positions and normalising the true focus curve with the corresponding imaging sensor focus merit value. The polynomial curve and the normalised focus merit curve intersect the sample in-focus plane at approximately 1.6 µm along the focussing line scan detector. This is where the polynomial curve peaks, indicating that the imaging line scan detector is below the in-focus plane (i.e. between the sample and the in-focus plane) and therefore the imaging sensor is said to be out of focus. This is verified by the peak in the true normalised focus merit curve. FIG. 14 illustrates the case where the imaging line scan detector is positioned at the in-focus plane and therefore the imaging sensor is said to be in focus.

Figure 15:
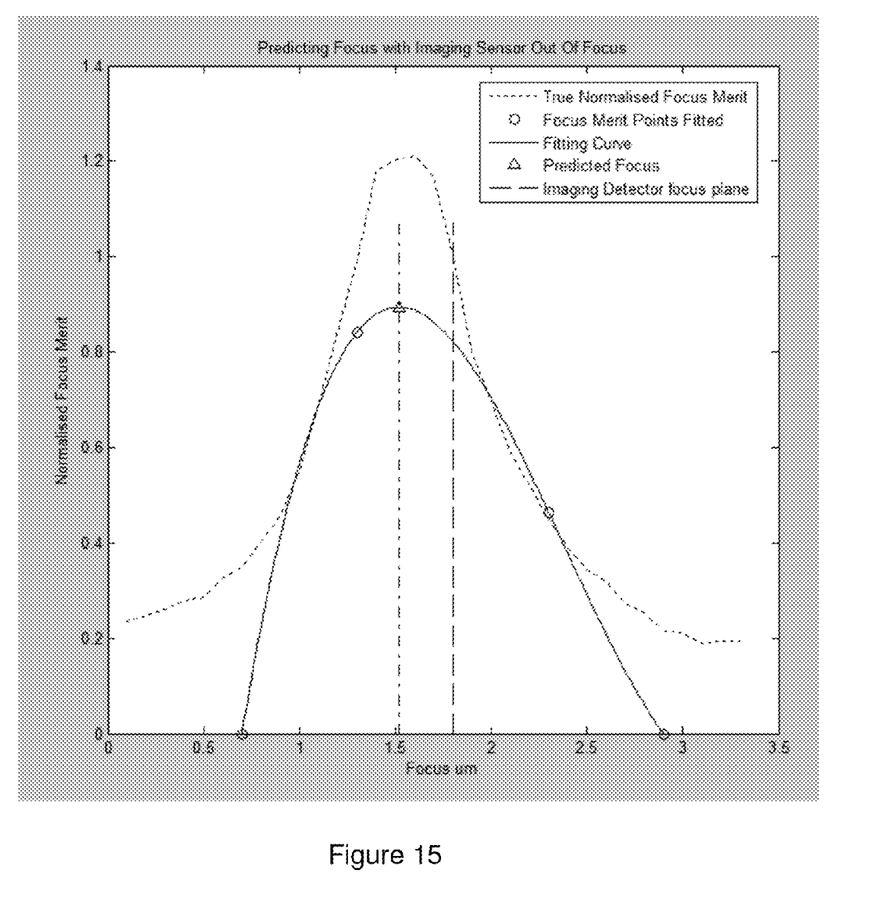
FIGS. 15 and 16 show an exemplary four point curve fit for predicting a focal plane in accordance with the invention.
Figure 16:
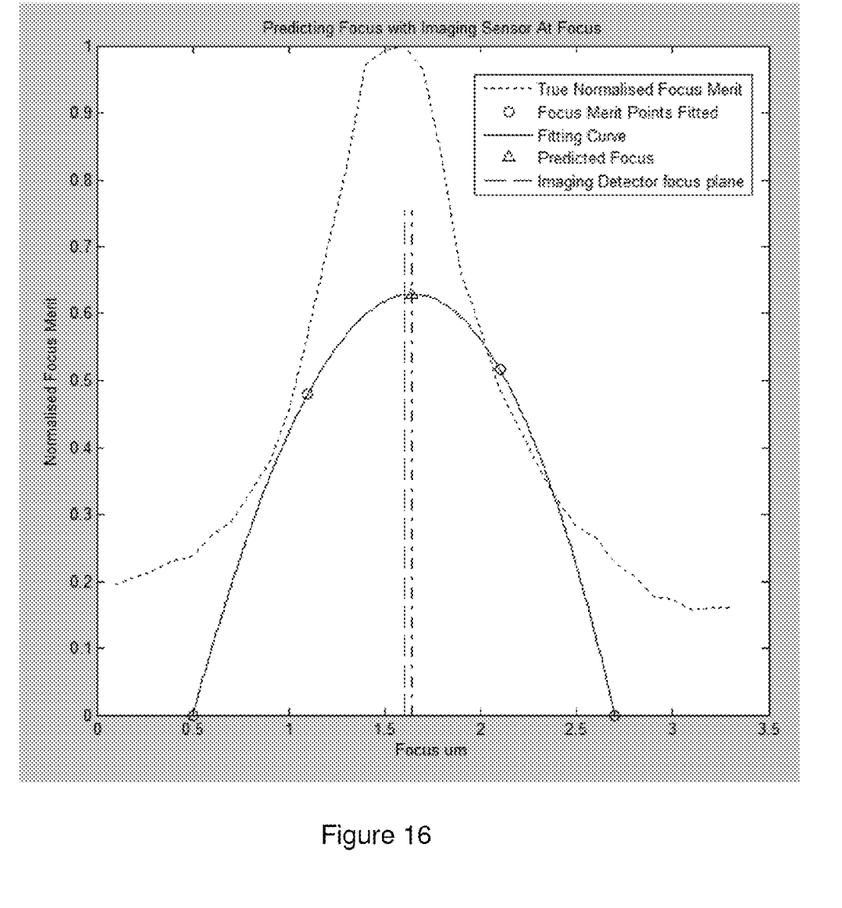

Alternatively, it is not necessary to use the normalising point from the imaging sensor 26 (the third focus merit value defined above) for the focus curve. FIGS. 15 and 16 show this alternative method of predicting the focal plane using a four point curve. FIG. 15 illustrates the case where the imaging line scan detector is out of focus. FIG. 16 illustrates the case where the imaging line scan detector is positioned at the in-focus plane and therefore the imaging sensor is said to be in focus.

With the present invention, the sample may be monitored continuously, wherein the focus level is predicted and corrected for each scanned line. If a lower data rate is desired, however, the sample may be monitored every 50 or 100 lines for example.

The invention claimed is:

1. A method of estimating an in-focus level of a target in an image scanning apparatus, wherein the image scanning apparatus comprises a first line scan detector configured to obtain one or more image scan lines of the target the method comprising:
   obtaining at least one focus scan line of the target using a second line scan detector, the second line scan detector comprising at least one focus shifting element such that each focus scan line is simultaneously obtained at respective first and second focus levels along the focus scan line, wherein the first focus level is different from the second focus level;
   obtaining at least one image scan line of the target using the first line scan detector, the image scan line being obtained at a respective third focus level;
   calculating at least one focus parameter using the at least one focus scan line; and
   estimating a nominal in-focus level of the target using the at least one focus parameter.

2. A method according to claim 1, wherein the at least two focus shifting elements comprise a first plurality of transparent regions having a first refractive index and a second plurality of transparent regions having a second refractive index which is greater than the first refractive index.

3. A method according to claim 2, wherein the at least two focus shifting elements comprise a third plurality of transparent regions having a first thickness and a fourth plurality of transparent regions having a second thickness which is higher than the first thickness.

4. A method according to claim 3, wherein the third plurality of transparent regions is the first plurality of transparent regions and wherein the fourth plurality of transparent regions is the second plurality of transparent regions.

5. A method according to claim 1, further comprising the step of calculating at least one further focus parameter using either said at least one image scan line or a further said focus scan line.

6. A method according to claim 1, wherein the calculating step comprises calculating at least one focus parameter for each of the first line scan detector and second line scan detector using the respective at least one image scan line and at least one focus scan line.

7. A method according to claim 1, wherein the focus level of the third focus level of the at least one image scan line is different to the first and second focus levels of the at least one focus scan line.

8. A method according to claim 1, wherein the image scan line and each focus scan line obtained at the first focus levels are obtained from a common first position within a plane passing through the target and having a normal plane defining an optic axis along which each of the first and second line scan detectors receive image information so as to produce the said respective image and focus scan lines, and wherein the image scan line and each focus scan line obtained at the second focus levels are obtained from a common second position within said plane, different from the common first position.

9. A method according to claim 8, wherein the image information is reflected to one of the said line scan detectors using a beam splitter.

10. A method according to claim 1, wherein the image and focus scan lines obtained are obtained from different positions in the target, and wherein the image information is obtained by the first and second line scan detectors along different optic axes from the target so as to produce the said respective image and focus scan lines.

11. A method according to claim 10, wherein the image information is reflected to one of the said line scan detectors using a mirror.

12. A method according to claim 11, wherein the mirror is arranged to rotate about a point centered upon the respective optic axis so as to provide focus scan lines of the target at different focus positions.

13. A method according to claim 11, wherein the mirror is arranged to rotate about a point displaced from the respective optic axis so as to provide focus scan lines of the target at different focus positions.

14. A method according to claim 11, further comprising moving the sample in accordance with the rotation of the mirror such that the focus line scans are obtained from a common location on the target.

15. A method according to claim 1, wherein said third focus level is between said second and first focus levels.

16. A method according to claim 1, wherein the focus parameter is calculated for each of the image and focus line scan detectors.

17. A method according to claim 16, wherein each of the said line scan detectors is a multi-channel detector, the method comprising calculating an in-focus level for different channels of the multi-channel detector.

18. A method according to claim 1, wherein the first focus parameter is a first focus merit value having a maximum value representing a first in-focus level and wherein the second focus parameter is a second focus merit value having a maximum value representing a second in-focus level.

19. A method according to claim 18, wherein the first focus merit value is a first normalised value and wherein the second focus merit value is a second normalised value.

20. A method according to claim 19, wherein estimating the nominal focus level comprises generating a fitting curve using said first and second normalised values and two outlying focus merit values, and determining a maximum value of the fitting curve.

21. A method according to claim 20, wherein generating the fitting curve further uses a third normalised value calculated from a third merit value having a maximum value representing a third in-focus level of the first line scan detector.

22. A method according to claim 1, wherein a temporal shift is applied between the data from the scan lines of the first and second line scan detectors and wherein the temporal shift is a function of the relative movement between the target and the detectors.

23. A method according to claim 1, wherein image scan lines are obtained from a number of locations on the target so as to form a swathe.

24. A method according to claim 23, wherein the nominal focus level is adjusted in real time during the formation of the swathe such that the image scan lines of the swathe comprise different nominal focus levels.

25. A method according to claim 1, wherein the method further comprises adjusting the focus level of the first line scan detector to the nominal in-focus level.

26. Image scanning apparatus comprising:
   a first line scan detector configured to obtain one or more image scan lines of a target;
   a second line scan detector configured to obtain one or more focus scan lines of the target, the second line scan detector comprising at least one focus shifting element such that each focus scan line is simultaneously obtained at respective first and second focus levels along the focus scan line; and a processor configured to:
obtain at least one focus scan line of the target;
obtain at least one image scan line of the target at a respective third focus level;
calculate at least one focus parameter using the at least one focus scan line; and
estimate a nominal in-focus level using the at least one focus parameter.

27. Image scanning apparatus according to claim 26, wherein the at least two focus shifting elements comprise a first plurality of transparent regions having a first refractive index and a second plurality of transparent regions having a second refractive index which is higher than the first refractive index.

28. Image scanning apparatus according to claim 27, wherein the at least two focus shifting elements comprise a third plurality of transparent regions having a first thickness and a fourth plurality of transparent regions having a second thickness which is higher than the first thickness.

29. Image scanning apparatus according to claim 28, wherein the third plurality of transparent regions is the first plurality of transparent regions and wherein the fourth plurality of transparent regions is the second plurality of transparent regions.

30. Image scanning apparatus according to claim 26, further comprising a first focussing device configured to modify the focus level between the target and the first line scan detector, and wherein the processor is further configured to operate the first focussing device to move the focus level of the first line scan detector to the estimated nominal in-focus level.

31. Image scanning apparatus according to claim 26, wherein the image scanning apparatus further comprises:
a target stage for retaining the target;
imaging optics for causing an image of the target to be provided to the first and second line scan detectors; and
a drive system for causing the first line scan detector to obtain image information from different locations on the target.

32. Image scanning apparatus according to claim 31, wherein each of the first and second line scan detectors is arranged to image a common location upon the target and wherein the imaging optics includes a beam splitter to direct part of the image information from the target to the first line scan detector and part to the second line scan detector.

33. Image scanning apparatus according to claim 31, wherein the first and second line scan detectors lie upon different respective optic axes of the imaging optics.

34. Image scanning apparatus according to claim 33, wherein the imaging optics includes a mirror arranged to direct part of the image information from the target to one of the first or second line scan detectors.

35. Image scanning apparatus according to claim 34, further comprising a mirror drive adapted to rotate the mirror so as to direct different image information to the said line scan detector.

36. Image scanning apparatus according to claim 26, further comprising a detector drive adapted to move the second line scan detector to and fro along its respective optic axis.

37. Image scanning apparatus according to claim 26, wherein one or each of the first and second line scan detectors is a multi-channel detector.

38. Image scanning apparatus according to claim 26, wherein the focus levels of the focus line scan and image line scan detectors are independently controllable.

39. Image scanning apparatus according to claim 26, wherein the apparatus is a virtual microscope.

40. A non-transitory computer readable medium containing a computer program product for causing a computer to perform the method according to claim 1.

* * * * *